Nov. 30, 1965  R. E. BUSCH  3,220,642
INDICATOR SETTING MECHANISM FOR CALCULATING MACHINE
Filed Aug. 11, 1964  3 Sheets-Sheet 1

INVENTOR.
RICHARD E. BUSCH
BY Charles R. Miranda

ATTORNEYS

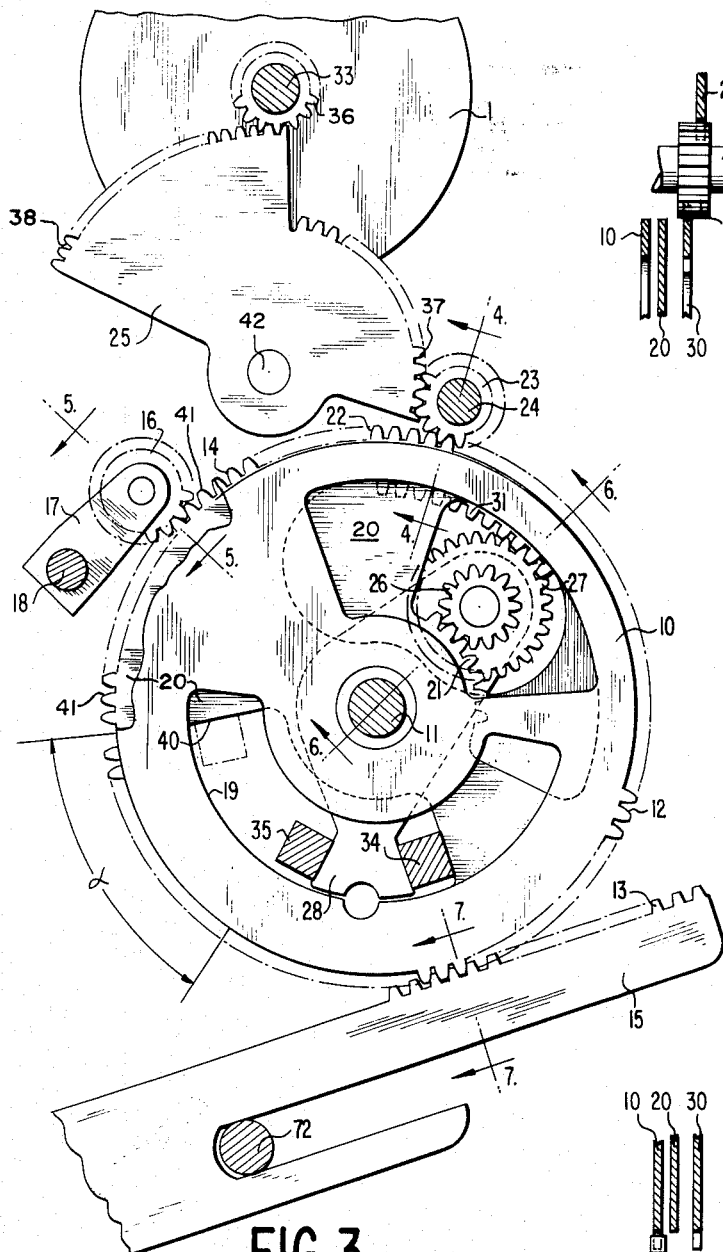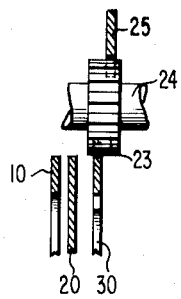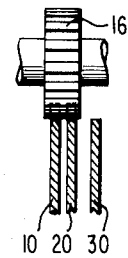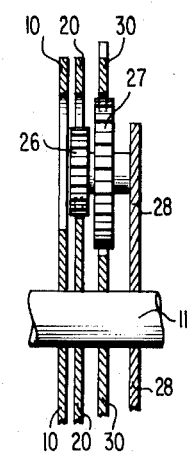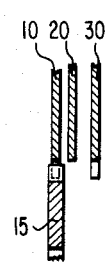
INVENTOR.
RICHARD E. BUSCH
BY Charles R. Miranda
ATTORNEYS Nov. 30, 1965 R. E. BUSCH 3,220,642
INDICATOR SETTING MECHANISM FOR CALCULATING MACHINE
Filed Aug. 11, 1964 3 Sheets-Sheet 3

INVENTOR.
RICHARD E. BUSCH
BY Charles R. Miranda
ATTORNEYS

United States Patent Office 3,220,642
Patented Nov. 30, 1965

3,220,642
INDICATOR SETTING MECHANISM FOR
CALCULATING MACHINE
Richard E. Busch, La Puente, Calif., assignor to Sperry
Rand Corporation, New York, N.Y., a corporation of
Delaware
Filed Aug. 11, 1964, Ser. No. 388,888
6 Claims. (Cl. 235—23)

The present invention relates in general to calculating machines and more particularly to cash registers and similar calculating devices capable of performing operations of addition, subtraction and multiplication and which provides a device capable of presenting a visual indication of the results of each cycle of machine operation.

The invention specifically relates to a novel indicator setting mechanism for cash registers which is capable, during one machine cycle, of setting the cash register indicator dials directly to their required designations in accordance with movement of the accumulator racks through an extent of travel determined by the particular key of the machine which has been depressed. While many cash registering mechanisms provide for such an indicator setting mechanism, these mechanisms have the disadvantageous characteristic that the indicator dials must be set to zero after each machine cycle and prior to providing a different indication representative of the next cycle of operation.

It is therefore an object of the instant invention to provide an indicator dial positioning mechanism for a cash registering machine having an indicator mechanism which is capable of setting a plurality of indicator dials to a required designation during one machine cycle, while allowing the dials to remain in their set position following such cycle.

It is another object of the instant invention to provide an indicator dial positioning mechanism for a cash registering machine in which the indicator dials may be advanced directly from any setting to a new setting in either direction during succeeding cycles of the machine.

It is a further object of the instant invention to provide an indicator dial positioning mechanism for cash registering machines which may be driven directly from the differential actuator mechanism of the machine so as to effect proper positioning of each indicator dial on the return stroke thereof.

It is still another object of the instant invention to provide an indicator dial positioning mechanism for cash registering machines which is capable of determining the differential relationship between successive indications so as to set each indicator dial directly from any setting to a new setting in either direction.

These and other objects, features and advantages of the present invention will become more obvious from the following description when taken in connection with the accompanying drawings, which show for purposes of illustration only, one embodiment in accordance with the present invention and wherein:

FIGURE 3 is a side view of one embodiment of an indicator positioning mechanism in accordance with the instant invention;

Figure 8:
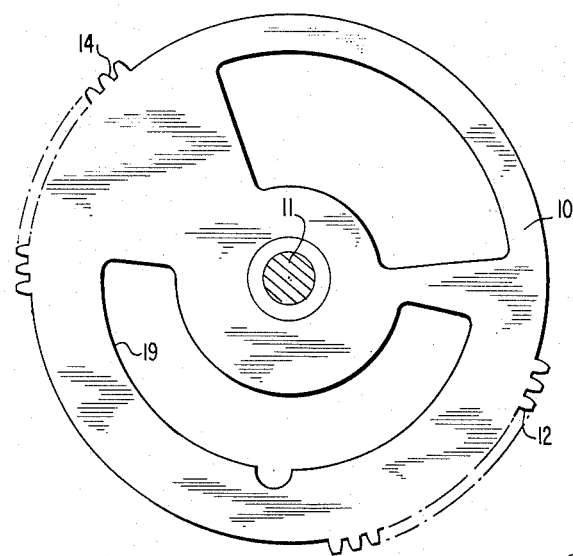
Figure 9:
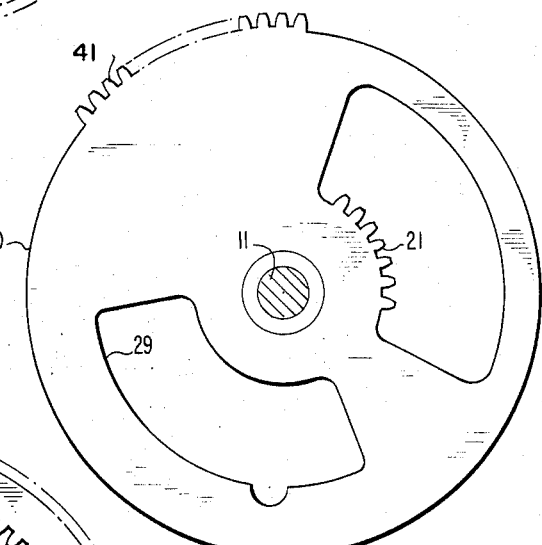
Figure 10:
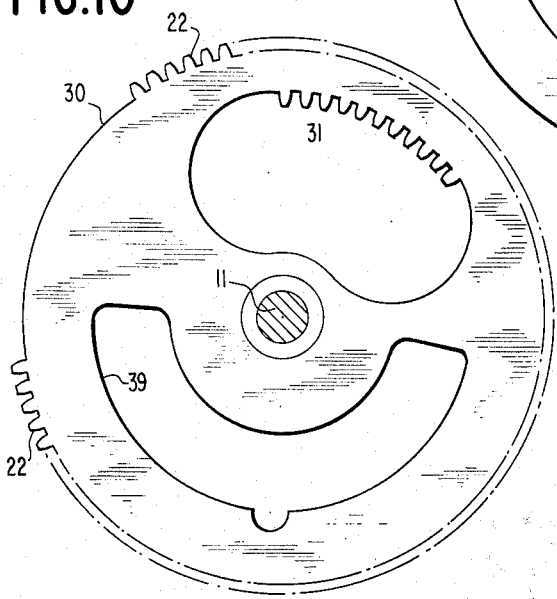

FIGURE 4 is a section along line 4—4 of FIGURE 3;
FIGURE 5 is a section along line 5—5 of FIGURE 3;
FIGURE 6 is a section along line 6—6 of FIGURE 3;
FIGURE 7 is a section along line 7—7 of FIGURE 3;

FIGURE 8 is a detail view of one of the sector elements in the mechanism of FIGURE 3;
FIGURE 9 is a detail view of another of the sector elements in the mechanism of FIGURE 3; and
FIGURE 10 is a detail view of a third sector element in the mechanism of FIGURE 3.

The present invention has been specifically designed for calculating machines wherein a plurality of aligned accumulator racks drive individual accumulator mechanisms to an extent determined by a particular value key depressed on the keyboard of the machine. For example, the instant invention may be utilized with a machine such as disclosed in the Robert E. Boydon Patent No. 2,583,810, issued on January 29, 1952, and the Edward P. Drake Patent No. 2,472,696, issued on June 7, 1949, each of which relate to the well known Clary adding machine. However, it should be understood that the invention may be equally well applied to other types of calculating and registering machines than disclosed in the above-mentioned patents without departing from the spirit and scope of the instant invention.

Figure 1:
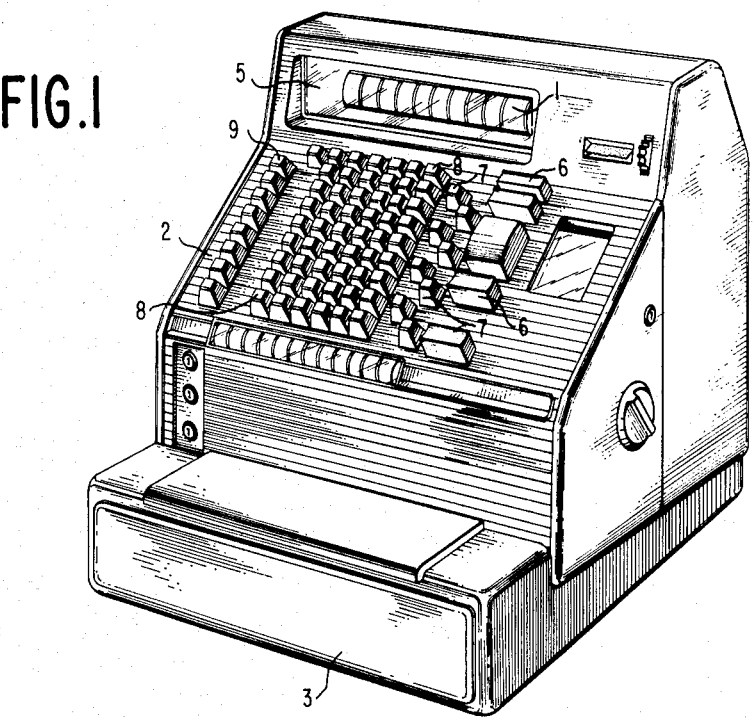
FIGURE 1 is a plan view of a calculating machine of the type into which the present invention may be incorporated.
Figure 2:
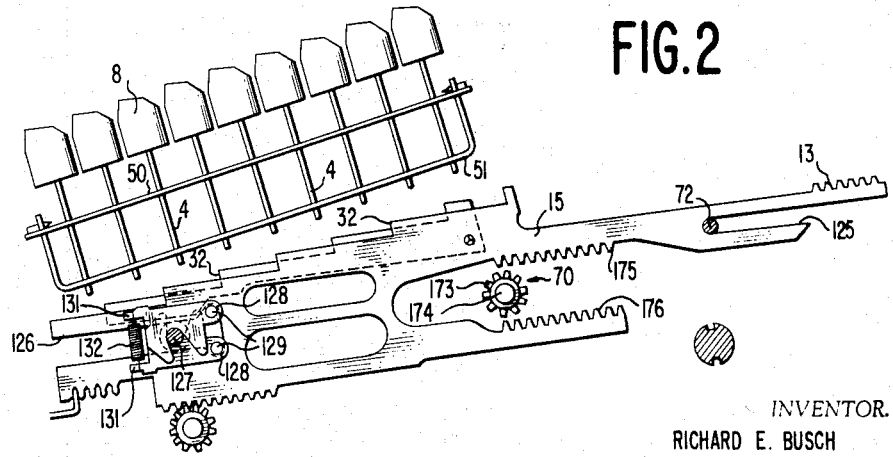
FIGURE 2 is a section view of one type of differential actuator with which the instant invention has been designed to cooperate.

The typical machine for which the instant invention has been designed includes a basic keyboard and drive rack combination such as disclosed in FIGURES 1 and 2. The calculating machine of the type with which the instant invention may cooperate, as illustrated in FIGURE 1, comprises a main cover which includes a keyboard 2 providing the various control keys which effect operation of the machine through desired selected functions. A cash drawer 3 is provided at the lower portion of the machine and above the keyboard 2 there is provided a dial system 1 visible through window 5, which is directly set by the mechanism of the instant invention.

The keyboard 2 contains a first column of keys 9 which provides for general identification of the operator by selected letters of the alphabet. Amounts are entered into the machine by way of amount keys 8, which are provided in six columns. A plurality of department keys 7 are provided adjacent the amount keys in two columns. The department keys 7 represent certain specific transactions, such as, "credit," "tax," "paid out," etc., in addition to departments, such as "meat," "produce," "hardware," etc. The right hand column on the keyboard 2 provides the function keys 6, which, for example, may include a "change balance due" key, a "total" key, a "grocery" key, etc.

The indicating dials 1 visible through a window 5 provide a visual representation of each transaction of the machine, including the operator identification, the amount, the department or transaction identification and the identification of the function. The mechanism for properly positioning each dial 1 forms the instant invention and is driven by a plurality of differential actuators, illustrated in FIGURE 2.

Each of the keys 8 on the keyboard includes a key stem 4 guided for vertical movement in aligned slots formed in keyboard frame plates 50 and 51. The lower edges of the key stems cooperate with spaced shoulders 32 formed on aligned racks 15 to limit the forward advancement of each rack to a number of increments corresponding to the numerical value of the key depressed in the associated role.

Means (not shown) associated with the main cam line are provided for yieldably advancing the racks 15 during the first half of a machine cycle and returning them to their home positions after a printing operation and during the latter half of the machine cycle. The racks are provided with slots 125 and 126 which are slidably guided over support shaft 72 and 127, respectively. The shaft 127 is slidably mounted in suitable guide slots (not shown) in the frame of the machine.

In order to yieldably advance the various racks, each rack has opposed notches 128 located at the closed end of its slot 126, the notches being normally engaged by rollers 129 carried by pawls 131 pivotally mounted on the shaft 127. A tension spring 132 extends between each pair of pawls whereby to urge the latter outwardly and thus hold the rollers 129 in driving engagement with the notches 128 thereby yieldably advancing any racks which are otherwise free to do so. When any one of the racks 15 is arrested by a depressed amount key stem or by zero block (not shown) the roller 129 will ride out of the notch 128 of the blocked rack and along the edge of the slot 126.

The primary accumulator 70 is basically disclosed in the aforementioned Drake Patent No. 2,472,696. Reference may be had to said patent for a complete disclosure of details of the accumulator not specifically shown herein. In general, the primary accumulator 70 comprises a plurality of accumulator gears 173 independently on an accumulator shaft 174. For the purpose of raising the accumulator 70 from its neutral position shown in FIGURE 2 into its upper position when the accumulator gears 173 mesh with the upper rack gear sections 175 of the associated racks or lowering the unit wherein the gears 173 mesh with the rack gear sections 176, an accumulator positioning mechanism such as disclosed in copending application Serial No. 388,901, filed August 11, 1964, in the name of Richard E. Busch, is provided.

In most cash registering machines, an indicator mechanism is provided to present to the operator of the machine and to those interested in the particular transactions registered by the machine a visual indication of the amounts inserted into the machine and the various totals and subtotals which result therefrom. These indicating mechanisms have taken several forms in the prior art device, including individual reciprocating tags and rotating wheels, which provide for an alphabetical, numerical and symbolic indication representing pertinent information about each transaction.

The present invention provides for a plurality of rotating indicator dials as seen in FIGURE 1, in which one or more rotating dials 1 are provided for each column of keys on the keyboard of the machine. Each rotating dial contains all of the symbolic, alphabetical and numerical designations provided by the particular column which it represents.

The indicator setting mechanism of the instant invention is in operative association with its respective indicator dial and its associated drive rack. Looking more particularly to FIGURE 3, a main drive sector 10 is rotatably mounted on a fixed shaft 11, which is supported in any known manner in the side frames of the machine (not shown). The main drive sector 10 (FIGURES 3 and 8) is provided with a section of gear teeth 12 which constantly mesh with corresponding teeth 13 on the reciprocating drive rack 15, such that during the first half of a cycle, as the drive rack 15 moves leftward until arrested in one of nine digital positions by a depressed one of a row of amount keys 8, for example, the main drive sector will be rotated in a clockwise direction.

Also mounted on shaft 11 closely adjacent to the main drive sector 10 is a control sector 20. The drive sector 10 and the control sector 20 (FIGURE 9) each are provided with a section of gear teeth 14 and 41 respectively in substantial registration along their outer periphery. A broad toothed idler 16 is mounted on a lever arm 17 for reciprocating movement into and out of engagement with the gear sections 14 and 41 on respective ones of the sectors 10 and 20, the lever arm 17 being controlled by the main cam line (not shown) through bail 18.

Mounted on shaft 11 closely adjacent to the control sector 20 is an indicator positioning sector 30. The indicator positioning sector 30 (FIGURE 10) provides an outer gear section 22 which meshes with an idler gear 23 mounted on a shaft 24 supported in the side frames of the machine (not shown), which in turn drives indicator drive sector 25 by way of gear teeth 37. The indicator drive sector 25 mounted for rotation on shaft 42 and is provided at one end thereof with a plurality of gear teeth 38 which mesh with a gear wheel 36 fixed to the drive shaft 33 of the indicator wheel 1, the number of teeth on the sector 25 is sufficient to drive the gear wheel 36 through one complete revolution making possible selective setting of the dial 1.

The control sector 20 is provided with an internal gear section 21 which continually meshes with the smaller gear 26 of a compound gear 26–27 whose larger gear 27 meshes with an internal gear section 31 on the indicator positioning sector 30, as illustrated in FIGURES 3 and 6.

The compound gear 26–27 is carried rotatively about an axis by a pivot lever means or arm 28 which is rotatably mounted on the supporting shaft 11 for the sectors and rests against a fixed first registration means or stop bar 34 which passes through aligned apertures 19, 29, and 39 in sectors 10, 20 and 30, respectively. Also passing through the aligned apertures is a second registration means in the form of a movable registration or universal bail 35, which is shifted from its full line position to its dotted line position, as indicated in FIGURE 3, during each cycle of machine operation by the main cam line (not shown). As indicated in FIGURE 3, the registration means 34 and 35 are provided on opposite sides of the pivot arm 28 so that the position of the pivot arm, and consequently the action of compound idler 26–27, with respect to the various sectors are substantially determined by these registration means.

The particular position of each element of the mechanism as illustrated in FIGURE 3 is typical when the rack 15 and the dial 1 are in zero positions.

Assuming the dial 1 to be standing at zero, before the main cam line causes differential movement of the rack 15 to the left to any digital position, the same cam line will cause the broad toothed idler 16 to be raised out of mesh with the sectors 10 and 20 via bail 18 controlled by the main cam line (not shown), and therefore only the sector 10 will be rotated in a clockwise direction by the rack 15 during this portion of the cycle. Also during this leftward movement of the rack 15, the movable universal bail 35 will move clockwise from its full line position as shown in FIGURE 3 to its dotted line position and idler 16 will be lowered into mesh at the end of this movement under the control of the main cam line.

During the second half of the cycle, when the rack 15 is returned to its home position, the idler 16 will remain lowered into contact with the sectors 10 and 20 so that the counterclockwise rotation of the sector 10 by the returning rack 15 will be transferred through the broad toothed idler 16 to the sector 20 rotating it in a counterclockwise direction to the same extent. At the same time, the movable registration or universal bail 35 will be returned to its full line position. However, since the arm 28 has remained against the fixed stop bar 34 during this operation, the sector 20 in its counterclockwise rotation will rotate the compound idler 26–27 about its own axis on arm 28 to thus advance the sector 30 clockwise and thereby set the dial 1 to the proper digital indicating position. It is noted that the sector 10 always returns to its zero position upon complete reciprocation of the rack 15.

A rotation of the sector 30 through an angle $\alpha$ (FIGURE 3) will produce a complete rotation of the idler gear 23 and thus a complete rotation of the indicating dial 1. Therefore, any rotation of sector 30 through a fraction of the angle $\alpha$ will produce a comparable fractional rotation of the dial 1.

The desired fractional rotation of the sector 30 to properly position the dial 1 is controlled by the sector 20, the pivot arm 28 and the compound gear 26–27. The sector 20 does not continuously rotate, but oscillates between a zero reference position, illustrated in FIGURE 3, and a plurality of incremental positions counterclockwise thereof. Each incremental position is determined by rotation of a reference edge 40 on the sector 20 through a fraction of the angle α representative of a selective position on the dial 1.

During forward movement of the rack 15, the universal bail 35 rotates in a clockwise direction to a position of substantial alignment with the zero reference position for edge 40. The bail 35 therefore drives the sector 20 to its zero position during each forward movement of the rack 15. Clockwise rotation of bail 35 also frees pivot arm 28 for clockwise rotation, which will occur with clockwise rotation of the sector 20. It should be apparent that the sector 30 will be rotated either (a) by rotation of the pivot arm 28 only if the sector 20 is arrested or (b) by rotation of the sector 20 only if the pivot arm 28 is arrested, but if both the sector 20 and the pivot arm 28 are free to move, the sector 30 will remain in position because of the usual drag on it from friction and/or standard indicator detenting, and compound idler 26–27 will merely roll to walk along its gear section 31.

If it is assumed that in the previous example the drive rack 15 in its return movement produced a rotation of the sectors 10, 20 and 30 through an angle of .7α so that the indicator wheel 1 produces an indication of the numeral "7," the edge 40 will have been rotated from its home or zero position to a point 7/10 of α counterclockwise thereof and will remain there until the next cycle. Now, if the drive rack 15 is moved to a digital position of 5, for example, the rack 15 will move to the left until arrested by the stem of the "5" key and in doing so will rotate the main drive sector 10 in a clockwise direction. However, since the broad toothed idler 16 is shifted to a position out of contact with the sectors 10 and 20 during this half of the cycle, no motion is transferred between the sectors 10 and 20.

However, the movable registration bail 35 is shifted from its full line position to its dotted line position, as occurs during the first half of every cycle of operation, and in doing so it contacts edge 40 of sector 20 and rotates it in a clockwise direction until the edge 40 is returned to its zero or home position. During this clockwise rotation of the sector 20, the internal gear section 21 on the sector will rotate the compound gear or idler 26–27 in a counterclockwise direction causing the larger gear 27 planetarily to walk along the internal gear section 31 of indicator positioning sector 30 thereby rotating the arm 28 in a clockwise direction away from the fixed stop bar 34.

During return movement of the rack 15 in the latter half cycle of machine operation, the broad tooth idler 16 will once again be engaged with the gear sections on the sectors 10 and 20 providing for transfer of counterclockwise rotation between the sectors 10 and 20. The sector 20 and the movable registration or universal bail 35 will begin counterclockwise rotation simultaneously. However, since the lever means or arm 28 is not arrested by the fixed registration bar, it having been rotated during the first half of the operation cycle by an amount equal to .7α, rotation of the sector 20 in a counterclockwise direction will not effect clockwise rotation of the sector 30 as in the previous example because the pivot arm is free to rotate. Rather, rotation of the sector 20 in a counterclockwise direction through an angle of .5α will cause the compound idler 26–27 to walk by rolling along the internal gearing section 31 of the sector 30 by a similar angle.

After rotating counterclockwise through an angle of .5α, the sector 20 will stop its rotation and remain in this position. However, the arm 28 will not as yet have returned to its rest position against the fixed stop bar 34, and so the movable universal bail 35 in returning to its full line position will continue the rotation of the arm 28 in a counterclockwise direction. Since the sector 20 is fixed in position, the smaller gear 26 of compound gear 26–27 will walk by rolling along the internal gear section 21 causing rotation of the compound idler in a counterclockwise direction for a distance of .2α, thereby causing a counterclockwise rotation of the sector 30 through a similar angle. The indicator wheel which previously provided an indication of the numeral "7" will therefore be advanced directly in a retrograde movement by two digits so that it will indicate the numeral "5."

It should be apparent that if in the previous example the rack 15 was shifted to a position representative of the numeral "9," for example, the pivot arm 28 would have returned to rest position where it has contacted the stop bar 34 on the return movement of the rack after rotation of the sector 20 through an angle .7α, such that continued counterclockwise rotation of the sector 20 with the pivot arm arrested would drive the sector 30 and the dial 1 by two digits to a position indicating the numeral "9."

The control sector 20 and the pivot arm 28 therefore combine to determine the differential resultant between the previous indication and a new indication so as to directly set the indicator dial in either direction to a new position.

I claim:

1. In a calculating machine of the cash registering type having a machine actuating mechanism and including a plurality of reciprocatable differential actuators adapted to be advanced from a zero position in incremental amounts to a selective position representative of a numerical value and subsequently returned to said zero position, the improvement in an indicator mechanism coupled to each differential actuator for providing a visual indication of the numerical value representative of each advance of said differential actuators; said indicator mechanism comprising indicator means providing indicia representative of each advance of said differential actuator, actuating means movably mounted for selectively positioning said means providing indicia, control means rotatably mounted and operatively associated with said actuating means by a single compound gear for driving the same in a sense and to an extent determined by the extent of movement different from the previous movement of said differential actuator, said control means being operatively associated with said differential actuator to be movable between a reference position and a plurality of equally spaced incremental positions representative of said selective positions of said actuator and means providing indicia, registration means including a member movable one way for driving said control means to its reference position with each advance of said differential actuator, and pivot lever means carrying said single compound gear internally associated with one and oppositely to the other of said control means and said actuating means as a planetary driving connection therebetween for differentially driving said actuating means in response to the extent of movement of said member the opposite way and of rotation of said control means during each return movement of said differential actuator, said pivot lever means being driven by said compound gear and said control means upon movement of said control means to its reference position by said registration means such that upon return movement of said differential actuator said actuating means is driven only as a result of movement of one of said control means and said pivot lever means after the other is arrested respectively in one of said incremental and reference positions.

2. In a calculating machine of the cash registering type having a machine actuating mechanism and including a plurality of reciprocatable differential actuators adapted to be advanced from a zero position in incremental amounts to a selective position representative of a numerical value and subsequently returned to said zero position, the improvement in an indicator mechanism coupled to each differential actuator for providing a visual indication of the numerical value representative of each advance of said differential actuators; said indicator mechanism comprising indicator means providing indicia representative of each advance of said differential actuator, actuating means rotatably mounted on a shaft for selectively positioning said means providing indicia, control means coaxially associated with said actuating means for driving the same in a sense and to an extent determined by the extent of movement different from the previous movement of said differential actuator, said control means being mounted on said shaft and rotatable upon return movement of said differential actuator between a first reference position and a plurality of equally spaced incremental positions representative of said selective positions of said actuator and means providing indicia, registration means including a bail movable one way by said actuating mechanism for driving said control means to said first reference position with each advance of said differential actuator, and pivot lever means carrying compound planet gear means having a small gear and a large gear respectively associated with each of said control means and said actuating means at opposed gear sections internally of each for differentially driving said actuating means in response to the extent of movement of said bail by said machine actuating mechanism the opposite way and of rotation of said control means during each return movement of said differential actuator, said pivot lever means being rotatable from a second reference position toward said first reference position by said planet gear means and control means during advance of said differential actuator such that said actuating means is driven during return movement of said differential actuator in said sense and extent determined by the arithmetic difference between the extent of rotation of said pivot lever means from said second reference position during advance of said differential actuator and the extent of rotation of said control means from said first reference position upon return movement of said differential actuator.

3. In a calculating machine of the cash registering type having a machine actuating mechanism and including a plurality of reciprocatable differential actuators adapted to be advanced from a zero position in incremental amounts to a selected position representative of a numerical value and subsequently returned to said zero position, the improvement in an indicator mechanism coupled to each differential actuator for providing a visual indication of the numerical value representative of each advance of said differential actuators; said indicator mechanism comprising a shaft, an indicator dial providing indicia of all said values along the surface thereof, first sector means rotatably mounted on said shaft in driven engagement with said differential actuator, second sector means mounted on said shaft for rotation between a first reference position and a plurality of equally spaced incremental positions, idler gear means driven by said actuating mechanism for simultaneously engaging said first and second sector means during return movement of said differential actuator, indicator dial actuating means for rotating said indicator dial to a position representing a numerical value, third sector means mounted on said shaft for rotation in driving engagement with said indicator dial actuating means, pivot lever means mounted on said shaft and including compound gear means rotatably mounted on one end thereof in opposed engagement with said second sector means and with an internal gear section of said third sector means and lever means, first registration means fixed in position for restraining the opposite end of said pivot lever means in a position of second reference, second registration means movable coaxially with respect to said shaft by said actuating mechanism back and forth between a position against said opposite end at said second position and said first reference position for driving said second sector means to said first reference position during advance of said differential actuator and for driving said pivot lever means to said second reference position to the extent therefrom after return movement of said differential actuator.

4. In a calculating machine of the cash registering type having a machine cycle actuating mechanism and including a plurality of reciprocatable differential actuators adapted to be advanced from a zero position in incremental amounts to a selective position representative of a numerical value and subsequently returned to a zero position, the improvement in an indicator mechanism coupled to each differential actuator for providing a visual indication of the numerical value representative of each advance of said differential actuators; said indicator mechanism comprising a rotatable indicator dial having indicia of said values along the circumference thereof, a shaft, first sector means rotatably mounted on said shaft in driven engagement with said differential actuator, second sector means mounted on said shaft for rotation between a zero registration first reference position and a plurality of equally spaced incremental positions, idler gear means driven by said actuating mechanism for simultaneously engaging said first and second sector means during return movement of said differential actuator so as to effect rotation of said second sector means to an extent determined by the extent of movement of said differential actuator, indicator dial actuating means for rotating said indicator dial, third sector means mounted on said shaft for rotation in driving engagement with said indicator dial actuating means in one sense when said advance exceeds a previous advance, pivot lever means rotatably mounted on said shaft and including compound gear means rotatably mounted on one end thereof and oppositely in engagement with said second and third sector means at a gear section in an aperture of each for effecting actuation of said third sector means by said second sector means when said pivot lever means is in a second reference position of zero registration, said pivot lever means being rotatable by said second sector means during advance of said differential actuator, first registration means fixed in said second reference position for preventing rotation of the opposite end of said pivot lever means beyond said second reference position of zero registration, second registration means movable by said actuating mechanism back and forth between said first position and said opposite end at said second position for driving said second sector means to its zero registration position during advance of said differential actuator and for driving said pivot lever to its zero registration position to the extent therefrom for effecting rotation of said third sector means in the opposite sense after return movement of said differential actuator.

5. In a calculating machine of the cash registering type having a machine cycle actuating mechanism and including a plurality of reciprocatable differential actuators adapted to be advanced by said actuating mechanism from a zero position in incremental amounts each representative of a numerical value to a selective position and subsequently returned to said zero position, the improvement in an indicator mechanism coupled to each differential actuator for providing a visual indication of the numerical value representative of each advance of said differential actuators; said indicator mechanism comprising a rotatable indicator dial having indicia of said values along the circumference thereof, first sector means rotatably mounted in driven engagement with said differential actuator, second sector means mounted for rotation between a first reference zero registration position and a plurality of equally spaced incremental positions, idler gear means driven by said actuating mechanism for simultaneously engaging said first and second sector means during return movement of said differential actuator so as to effect rotation of said second sector means to an extent determined by the extent of movement of said differential actuator, indicator dial actuating means for rotating said indicator dial to each said position representing a numerical value, third sector means mounted for rotation in driving engagement with said indicator dial actuating means, pivot lever means including a single compound gear rotatably mounted on one end thereof in engagement with said second and third sector means internally for effecting actuation of said third sector means by said second sector means when said pivot lever means is in a second reference position of zero registration, said pivot lever means being rotatable from said second position by said second sector means during advance of said differential actuator, first registration means fixed in position for preventing rotation of said pivot lever means beyond said second position of zero registration, second registration means movable between said second sector means at said first position and the opposite end of said lever means at said second position for driving said second sector means to its zero registration reference position during advance of said differential actuator and for driving said pivot lever to its zero registration reference position after return movement of said differential actuator; said first, second and third sector means and said pivot lever means being mounted for rotation concentrically on a fixed, common pivot shaft, said first and second registration means passing through registration apertures in said sector means.

6. In a calculating machine of the cash registering type having a machine cycle actuating mechanism and including a plurality of reciprocatable differential racks adapted to be advanced by said mechanism from a zero position in equal incremental amounts to one of a series of selective positions each representative of a numerical value and subsequently returned to said zero position, the improvement in an indicator mechanism coupled to each differential rack for providing a visual indication of the numerical value representative of each advance of said differential actuators comprising a rotatable indicator dial having indicia of said values along the circumference thereof, first sector mean rotatably mounted in driven engagement with said differential rack, second sector means mounted for rotation between a zero registration first reference position and a plurality of equally spaced incremental positions, idler gear means driven by said actuating mechanism for simultaneously engaging said first and second sector means during return movement of said differential rack so as to effect coordinate rotation of said first and second sector means during said return movement, indicator dial actuating means for rotating said indicator dial to a position representing the numerical value of the position to which said differential rack has been advanced, third sector means mounted for rotation in driving engagement with said indicator dial actuating means, pivot lever means including compound gear means of two different sizes rotatably mounted on one planet axis on one arm thereof and continuously in engagement with said second sector means in a gear aperture thereof at an inner gear section and with said third sector means in a gear aperture thereof at an internal gear section for effecting actuation of said third sector means by said second sector means when said pivot lever means is arrested in a second reference position of zero registration and by said pivot lever means when said second sector mean is arrested by said idler gear means and differential rack at the end of said return movement thereof, said pivot lever means being rotatable by said second sector means during advance of said differential rack, first registration means extending through corresponding registration apertures in all said sector means and fixed in position for preventing rotation of said pivot lever means beyond its position of zero registration by engagement with one side of an opposite arm of said lever means, second registration means defined by a universal bail movable in said registration apertures by said machine cycle actuating mechanism in one direction between a first position and a second position for driving said second sector means to its zero registration position during advance of said differential rack and in the opposite direction for driving said pivot lever to its zero registration position after return movement of said differential rack; said first, second and third sector means and said pivot lever means and said universal bail being mounted for rotation concentrically about a fixed common pivot shaft.

References Cited by the Examiner
UNITED STATES PATENTS

| | | |
|---|---|---|
| 1,189,279 | 7/1916 | Midgley. |
| 1,279,053 | 9/1918 | Werner. |
| 1,529,955 | 3/1925 | Kolbe _____ 235—23 |
| 2,571,645 | 10/1951 | Zurbuchen _____ 235—23 |

LEO SMILOW, *Primary Examiner.*

STEPHEN J. TOMSKY, *Examiner.*